US010479640B2

(12) United States Patent
Davis, Jr. et al.

(10) Patent No.: US 10,479,640 B2
(45) Date of Patent: Nov. 19, 2019

(54) METHOD FOR TRANSPORTING FUEL TO A GEOGRAPHIC SPECIFIC LOCATION AND RETRIEVING EMPTY FUEL HOSE

(71) Applicant: Hammerhead Rock Tools, Inc., Houston, TX (US)

(72) Inventors: Joe B. Davis, Jr., Houston, TX (US); Geoff N. Buck, Houston, TX (US)

(*) Notice: Subject to any disclaimer, the term of this patent is extended or adjusted under 35 U.S.C. 154(b) by 73 days.

(21) Appl. No.: 15/665,673

(22) Filed: Aug. 1, 2017

(65) Prior Publication Data

US 2019/0039854 A1 Feb. 7, 2019

(51) Int. Cl.

| B65H 51/10 | (2006.01) |
| B65H 51/32 | (2006.01) |
| B67D 7/40 | (2010.01) |
| B65H 75/42 | (2006.01) |
| G01S 19/11 | (2010.01) |

(52) U.S. Cl.
CPC .............. *B65H 51/10* (2013.01); *B65H 51/32* (2013.01); *B65H 75/425* (2013.01); *B67D 7/40* (2013.01); *B65H 2701/33* (2013.01); *G01S 19/11* (2013.01); *Y10T 137/6899* (2015.04)

(58) Field of Classification Search
CPC .. B65H 2701/33; B65H 75/362; B65H 51/32; B67D 7/40; Y10T 137/6899
See application file for complete search history.

(56) References Cited

U.S. PATENT DOCUMENTS

| 3,713,301 A | 1/1973 | Bryant |
| 3,829,064 A | 8/1974 | Jackson |
| 5,139,751 A | 8/1992 | Mansfield |
| 5,938,100 A | 8/1999 | Bloser |
| 6,105,604 A * | 8/2000 | Furness .................. A62C 33/04 137/355.16 |
| 6,679,297 B1 * | 1/2004 | Nishi ...................... F16L 11/12 138/137 |
| 7,566,024 B2 * | 7/2009 | Krise .................... B60P 1/6463 242/397.1 |
| 8,733,433 B2 * | 5/2014 | Coles ...................... E21B 19/22 166/77.2 |
| 9,272,874 B1 | 3/2016 | Davis |
| 2008/0067280 A1 | 3/2008 | Baker |
| 2012/0118397 A1 | 5/2012 | Novotney et al. |
| 2014/0318638 A1 * | 10/2014 | Harwood ............. B65H 75/425 137/355.12 |
| 2018/0025345 A1 * | 1/2018 | Kittoe ..................... G06Q 20/24 705/41 |

* cited by examiner

*Primary Examiner* — Kevin F Murphy
(74) *Attorney, Agent, or Firm* — Nolte Intellectual Property Law Group (57) ABSTRACT

A method for transporting fuel to a geographic specific location and retrieving empty fuel hose by connecting a fuel hose to a vessel, deploying the fuel hose from the moveable container associated with the tugger while transporting the moveable container and tugger to a temporary fuel terminal with a manifold, connecting the fuel hose to the manifold, charging the fuel hose with fuel from the vessel, and retrieving the fuel hose by passing the fuel hose over a lead roller mounted to the frame in the first segment to a second segment. The fuel hose is aligned in the tugger for high speed retrieval without entanglement for storage in a moveable container.

11 Claims, 9 Drawing Sheets

708 — INSTALLING A CONTROLLER WITH SENSORS ON THE TUGGER TO AUTOMATICALLY PROVIDE A PREWRITTEN MESSAGE TO A CLIENT DEVICE VIA A NETWORK THAT THE FUEL HOSE NEEDS TO BE PICKED UP

710 — MOUNTING A GPS TRANSMITTER TO THE TUGGER AND MAINTAINING THE GPS TRANSMITTER IN COMMUNICATION WITH A NETWORK ENABLING VIEWING OF A PLURALITY OF TUGGERS IN USE AT A GEOGRAPHIC LOCATION TO BE IDENTIFIED ON A MAP AND MONITORED USING A CLIENT DEVICE

FIGURE 8

801 — CONNECTING AN ANTI-STATIC LAY FLAT FUEL HOSE HAVING A PLURALITY OF SECTIONS FORMING A PORTABLE REMOVABLE PIPELINE THAT EXTENDS A PLURALITY OF MILES TO A TUGGER, WHEREIN EACH SECTION HAS A LENGTH FROM 500 FEET TO 700 FEET

803 — THE RETRIEVING THE FUEL HOSE CONTINUOUSLY WITH THE SEGMENTS STILL CONNECTED TOGETHER BY THE TUGGER, WHEREIN THE TUGGER PASSES THE FUEL HOSE OVER A LEAD ROLLER MOUNTED TO THE FRAME IN THE FIRST SEGMENT TO A SECOND SEGMENT, WHEREIN THE SECOND SEGMENT IS AT AN ANGLE FROM 5 DEGREES TO 45 DEGREES FROM THE FIRST SEGMENT, THE SECOND SEGMENT SEQUENTIALLY AND CONTINUOUSLY PASSES THE FUEL HOSE OVER THE FIRST LOWER DRIVE ROLLER, UNDER THE TOP DRIVE ROLLER CONNECTED TO A DRIVE ARM, OVER THE SECOND LOWER DRIVE ROLLER, AND OVER THE FRAME ROLLER, AND WHEREIN THE DRIVE ARM OPERATIVELY ALIGNS THE TOP DRIVE ROLLER BETWEEN THE LOWER DRIVE ROLLERS; AND WHEREIN A FIFTH ROLLER MOUNTED TO A FIFTH ROLLER SUPPORT CONNECTED TO THE FRAME AND A SIXTH ROLLER CONNECTED TO A SIXTH ROLLER SUPPORT CONNECTED TO THE FRAME, ENSURES THE FUEL HOSE IS ALIGNED IN THE TUGGER FOR HIGH SPEED RETRIEVAL WITHOUT ENTANGLEMENT FOR STORAGE IN A MOVEABLE CONTAINER

METHOD FOR TRANSPORTING FUEL TO A GEOGRAPHIC SPECIFIC LOCATION AND RETRIEVING EMPTY FUEL HOSE

FIELD

The present embodiments generally relate to a method to quickly deploy and retrieve a fuel hose, such as in disaster areas for refueling of multiple vessels simultaneously.

BACKGROUND

A need exists for a method to quickly load miles of connected fuel hoses after deployment a rate of from about 1 mile per hour to 5 miles per hour.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The invention stops death of workers in the field, because fewer people are needed to retrieve very long fuel hoses in the field.

The invention provides environmental protection by eliminating the need to disconnect a very long fuel hose that is miles long in multiple sections before retrieving the hose, which prevents spillage into the land causing harm to the environment and individuals as the segments are disconnected.

The invention prevents explosions by enabling very fast high speed retrieval of fuel hoses quickly after being used, so that lightning and human carelessness cannot cause the fuel hose to ignite as it lies unused in the field for days at a time.

The invention is safer for field hands to use because the rollers are elevated on a frame and mounted away from the workers, eliminating the need for workers to place their hands near the roller. Which prevents harm to the workers arms and hands.

The invention enables fuel hoses to be retrieved at variable high speeds into a container, which makes it difficult to sabotage by terrorists at an isolated location.

The present embodiments relate to a method for transporting fuel to a geographic specific location and retrieving empty fuel hose with a tugger.

The method involves connecting a fuel hose to a vessel having a supply of fuel.

The fuel hose is installed in a moveable container having a tugger.

The moveable container deploys fuel hose while transporting the moveable container and tugger to a temporary terminal facility with a manifold.

The method further involves connecting the fuel hose to the manifold at the temporary terminal facility.

The method involves charging the fuel hose with fuel from the vessel which can be a pipeline.

The fuel is diesel fuel or a diesel fuel derivative.

The method involves delivering a preset quantity of fuel to the temporary fuel terminal facilities.

The method involves retrieving the fuel hose once delivery is complete by passing the fuel hose over a lead roller mounted to a frame of the tugger which is located in a first segment of the tugger.

The first segment is pitched at an angle to a horizontal to a second segment of the tugger.

The first segment is at an angle from 5 degrees to 45 degrees from the second horizontal segment.

In the second segment fuel hose is sequentially and continuously passed over the first lower drive roller, under the top drive roller connected to a drive arm which is connected to a powered cylinder that is at least one of: a hydraulic cylinder and a. pneumatic cylinder.

The fuel hose continues to move continuous over the second lower drive roller, and finally over the frame roller.

The drive arm operatively aligns the top drive roller between the lower drive rollers.

A fifth roller mounted to a fifth roller support connected to the frame and sixth roller connected to a sixth roller support connected to the frame ensure the fuel hose is aligned in the tugger for high speed retrieval and high speed insertion into the moveable storage container without entanglement for storage in a moveable container.

The following terms are used herein:

The phrase "charging the fuel hose with fuel" refers to pumping fuel, such as a diesel fuel derivative into the fuel hose until the expands and is fully charged, transferring the fuel form the vessel or pipeline to another remote location which can be miles away.

The phrase "connecting the fuel hose to the manifold" refers to the step of securing a fuel hose to a manifold for further transfer to a vehicle or equipment such as in a disaster area.

The term "controller" refers to a device that controls hydraulic pressure applied by the drive arm and the speed at which the rollers are turned by the motor to retrieve the fuel hose. The controller can be a processor with data storage or computer readable media that connects to a network that allows remote operation of the tugger from a cell phone or laptop from one or more additionally remote locations, for example, miles from the tugger.

The phrase "connecting a fuel hose to a vessel" refers to the step of securing a fuel hose to a vessel or a pipeline, in a leak free connection.

The phrase "deploying fuel hose from the moveable container" refers to the removing of the fuel hose from the movable container to the ground at a preset or variable speed continuously and without stopping to connect segments.

The term "drive arm" refers to a hydraulically operated segment that pulls a roller downward with pressure onto the fuel hose.

The term "GPS transmitter" refers to a device that transmits a latitude and longitude for the tugger to a network for remote monitoring of a plurality of tuggers simultaneously.

The term "map" refers the geographic presentation onto which the GPS transmitted location is presented for each tugger, which can be by country, province, county, or address.

The term "motor" refers to a hydraulic motor that is connected to the upper drive roller that provides the power to pull in the fuel hose by the tugger.

The term "network" refers to a cellular network, a global communication network, a local area network, a wide area network, a satellite network or combinations thereof for communicating between the controller and a client device.

The term "permanent installation" refers to permanent terminals, pipelines, and other non-easily removable facilities that transport fuel from a first location to a second location. Permanent installations are the opposite of the present invention.

The term "powered cylinder" refers to the hydraulic cylinder, a pneumatic cylinder, or combinations of cylinders, which pull the drive arm down onto the fuel hose or push the drive arm away from the rollers when the fuel hose has been fully retrieved.

The term "preset quantity of fuel" refers to the amount of fuel to flow into the temporary fuel terminal facility prior to retrieving the fuel hose using the tugger.

The term "prewritten message" refers to a message transmitted to a client device advising an operator that the fuel hose is ready to be picked up, or has been picked up.

The phrase "retrieving the fuel hose" refers to the continuous pick up of fuel hoses after fuel deployment solely using the tugger and wherein the fuel hose is inserted into a moveable container, such as an ISO container, an open trailer, or a closed container with an opening to receive flattened fuel hoses.

The term "sensor" refers to a device that monitors pick up of the fuel hose mounted to the frame in communication with the controller to indicate that all the fuel hoses have been retrieved by the tugger.

The term "temporary fuel terminal facilities" can be a bladder farm, a barge, a vessel, a truck, a tent with moveable containers inside, and such moveable transportable facilities that can be broken down or moved in less than 1 hour.

In embodiments, the high speed retrieval is from 1 mph to 5 mph.

In embodiments, the high speed retrieval is at a variable speed.

In embodiments the tugger is positioned between a permanent fuel terminal and a ternporary fuel terminal.

In embodiments, the temporary fuel terminal is a bladder farm with a plurality of inflatable rubber tanks connected to a central manifold for deployment of fuel to a plurality of equipment needing fuel.

In embodiments, the vessel is at least one of: a truck, a tanker, a barge, and an aircraft fuel tanker.

In embodiments, the method includes moving the drive arm using at least one powered cylinder.

In embodiments, the method teaches using a first powered cylinder attached between the drive arm and the frame, and a second powered cylinder attached between the drive arm and the frame opposite the first powered cylinder, for raising or lowering the drive arm.

In embodiments, the method includes connecting a motor to the top drive roller, the at least one lower drive roller, or both.

In embodiments, the method includes installing a controller with sensors on the tugger to automatically provide a prewritten message to a client device via a network that the fuel hose needs to be picked up.

In embodiments, the method includes mounting a UPS transmitter mounted to the tugger and in communication with a network enabling viewing of a plurality of tuggers in use at a geographic location to be identified on a map and monitored using the client device.

Figure 1A:
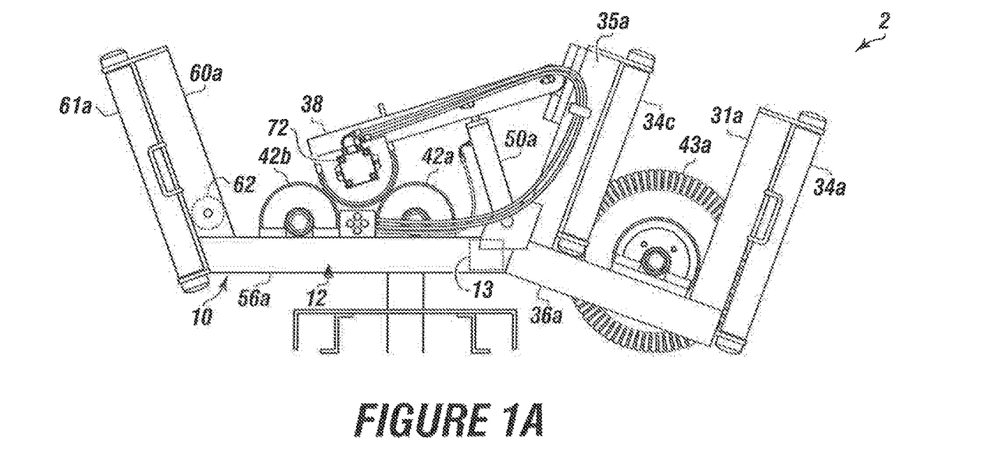
FIG. 1A depicts a first side view of a tugger used in the method.
Figure 1B:
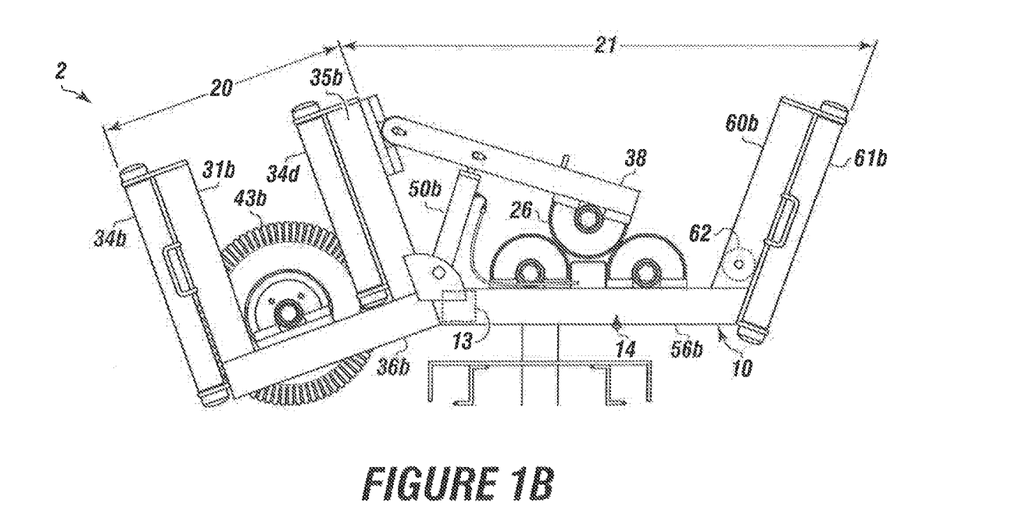
FIG. 1B depicts a second side view of the tugger of FIG. 1A.

Turning now to the Figures, FIG. 1A depicts a first side view of an apparatus. FIG. 1B depicts a second side view of the apparatus of FIG. 1A.

Referring to FIG. 1A and 1B, the apparatus 2 can include a frame 10. The frame 10 can be made from any material. Illustrative materials can include powder coated steel, metal, composites, alloys, or the like.

The frame 10 can have any dimension. For example, the frame can have a width from about 2 feet to about 5 feet and a length of about 3 feet to about 8 feet. The frame can be made from hollow steel tubular or solid channel steel, tubular members, angle iron members, I-beam members, C-charmel members or other structural members.

The frame 10 can have a first side 12. The first side 12 can be connected with a second side 14 by a cross member 13.

The distance between the first side 12 and the second side 14 can be configured to allow the fuel hose to pass there through. In embodiments, the frame 10 can have a distance between the first side 12 and the second side 14 that ranges from about 1.5 feet to about 2.5 feet.

The frame 10 can include a first segment 20 and a second segment 21. Each segment can have a length of from about 1 foot to about 3 feet long. The first segment 20 can be connected to the second segment 21 at an angle ranging from about 5 degrees to about 45 degrees.

The first side 12 of the first segment 20 can have a first base rail 36a. The second side 14 of the first segment 20 can have a second base rail 36b.

The first base rail 36a and the second base rail 36b can support one or more lead rollers 43a and 43b. The lead rollers can be sized to guide a fuel hose and ensure that couplings or other obstructions on the fuel hose do not get stuck as the fuel hose is deployed or retrieved. In embodiments, two lead rollers can be used. The one or more lead rollers 43a and 43b can be pneumatic tires.

The first segment 20 can include a first roller support 31a, a second roller support 31b, a third roller support 35a, and a fourth roller support 35b. The first roller support 31a and the third roller support 35a can be connected with the first base rail 36a, and the second roller support 31b and the fourth roller support 35b can be connected with the second base rail 36b. The first roller support 31a and the third roller support 35a can extend from the first base rail 36a. The second roller support 31b and the fourth roller support 35b can extend from the second base rail 36b.

The first roller support 31a can support a first roller 34a and the second roller support 31b can support a second roller 34b. The third roller support 35a can support a third roller 34c, and the fourth roller support 35b can support a fourth roller 34d. The first roller 34a, the second roller 34b, the third roller 34c, and the fourth roller 34d can be supported such that they rotate freely. The first roller 34a, the second roller 34b, the third roller 34c, and the fourth roller 34d can guide the fuel hose as it is urged through the apparatus 2, preventing the fuel hose from getting stuck on the frame or being damaged.

A drive arm 38 can be operatively connected with the frame 10. For example, the drive arm 38 can be connected with the third roller support 35a and the fourth roller support 35b. The drive arm 38 can be connected with the third roller support 35a and the fourth roller support 35b by pivot bearings, pins, or the like.

The drive arm 38 can be moved by one or more powered cylinders 50a and 50b. The powered cylinders 50a and 50b can be supported by the cross member 13 or another portion of the frame 10.

The powered cylinders 50a and 50b can be pneumatic cylinders, hydraulic cylinders, worm gears, bail screws, mechanical actuators, or the like.

A top drive roller 26 can be connected with the drive arm 38.

The second segment 21 can include a third base rail 56a and a fourth base rail 56b.

The third base rail 56a and the fourth base rail 56b can operatively support one or more lower drive rollers 42a and 42b. The top drive roller 26 can be selectively aligned in an operative position with the lower drive roller 42a and 42b.

The third base rail 56a can be connected with a fifth roller support 60a, and the fourth base rail 56b can be connected with a sixth roller support 60b. The fifth roller support 60a can operatively support a fifth roller 61a, and the sixth roller support 60b can operatively support a sixth roller 61b. The fifth roller 61a and the sixth roller 61b can be supported such that they can move freely. The fifth roller 61a and the sixth roller 61b can guide the fuel hose as it passes through the apparatus.

A frame roller 62 can be supported by the fifth roller support 60a and the sixth roller support 60b.

As the fuel hose is urged through the apparatus into the support structure, the rollers 34a, 34b, 34c, 34d, 61a, 61b, and 62 can guide the fuel hose to ensure that no pitch points form. The rollers 34a, 34b, 34c, 34d, 61a, 61b, and 62 can also prevent contact of the fuel hose with the frame 10, reducing friction wear of the fuel hose.

The powered cylinders 50a and 50b can be connected with a power system. A motor 72 can be operatively connected with the power system.

The motor 72 can be a pneumatic motor, an electric motor, an internal combustion engine, a hydraulic motor, or the like. In one or more embodiments, a drive power system can be connected with the motor 72 instead of the power system. For example, if the motor 72 is an electric motor a power source and electric control panel can be operatively connected with the motor 72 to drive and control the motor 72. The electric control panel can be a variable speed drive controller. The connection of the motor and powering of the motor is known to one skilled in the art with the aid of this disclosure.

The motor 72 can drive the top drive roller 26, one or more of the lower drive rollers 42a and 42b, or combinations thereof.

In one or more embodiments, the top drive roller 26, one or more of the lower drive rollers 42a and 42b, or combinations thereof can be an idler roller as long as at least one of the drive rollers 26, 42a, and 42b is powered by the motor 72.

Figure 2:
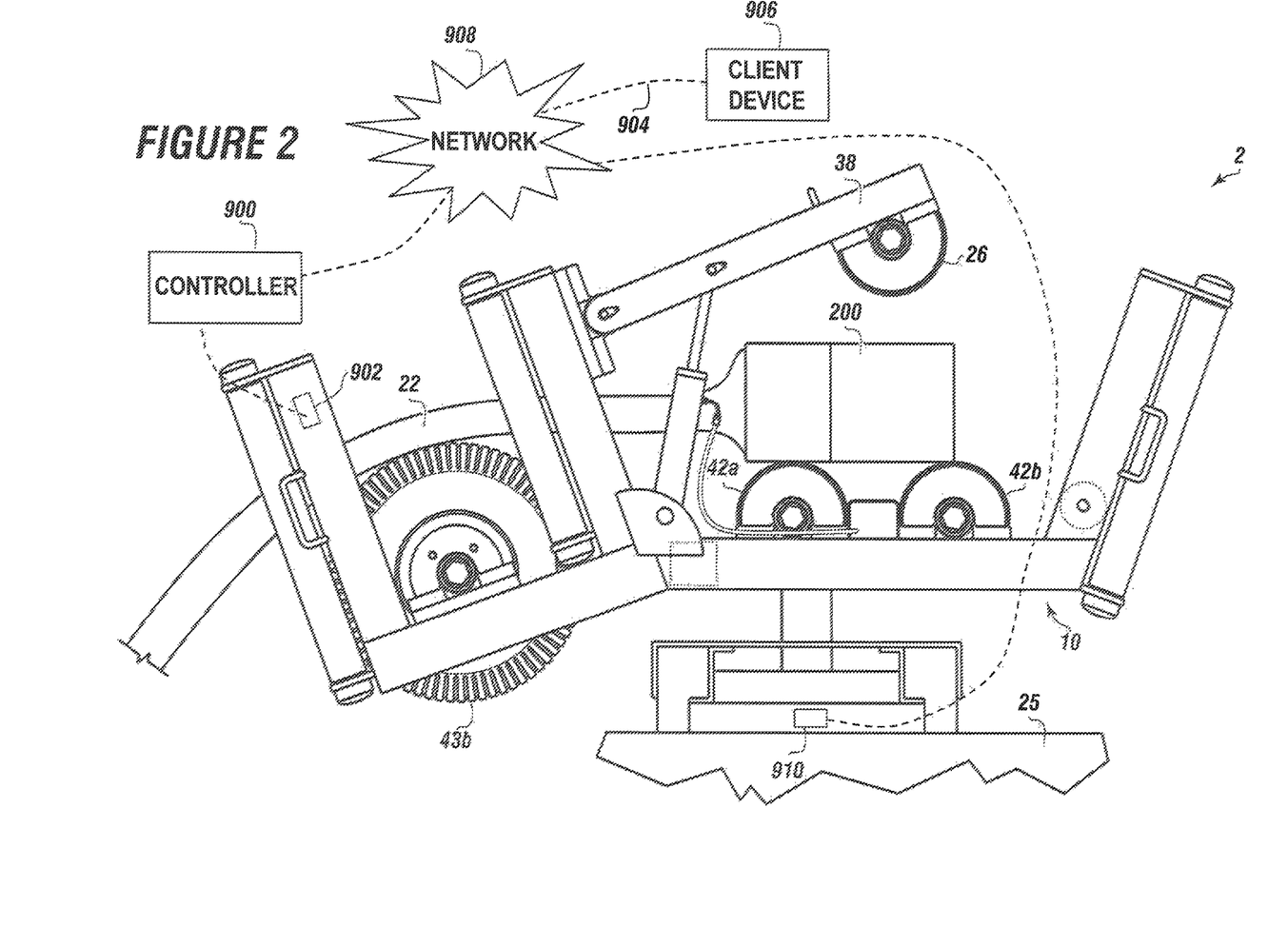
FIG. 2 depicts a fuel hose being retrieved by a tugger.

FIG. 2 depicts a fuel hose being retrieved into a support structure,

The support, structure 25 cart be a trailer, a vehicle, a crate, a building, a skid, or the like.

The apparatus 2 can be connected with the support structure 25. To start retrieving the fuel hose with the apparatus 2, a proximate end 200 of the fuel hose 22 can be placed. onto at least a portion of the lower drive rollers 42a and 42b. The proximate end 200 can be placed on at least a portion of the lower drive rollers 42a and 42b using a strap. The strap can be a rope or the like. A double loop can be formed on the strap and the double loop can be connected with the proximate end 200 of the fuel hose 22. The strap can be lifted by hand and the fuel hose can be loaded on the apparatus 2.

Once the fuel hose 22 is positioned on the apparatus 2, the drive arm 38 can be lowered so that the top drive roller 26 is operatively engaged with the fuel hose 22.

The top drive roller 26 and the lower drive rollers 42a and 42b can cooperate to urge the fuel hose 22 through the apparatus 2 into the support structure 25.

The frame 10 and lead roller 43b are also depicted in this Figure.

In embodiments, a controller 900 with at least one sensor 902 is on the tugger to automatically provide a prewritten message 904 to a client device 906 via a network 908 that the fuel hose needs to be picked up.

In embodiments, a UPS transmitter 910 is mounted to the tugger. The UPS transmitter is in communication with the network enabling viewing of a plurality of tuggers in use at a geographic location identified on a map and monitoring the tuggers using the client device.

Figure 3:
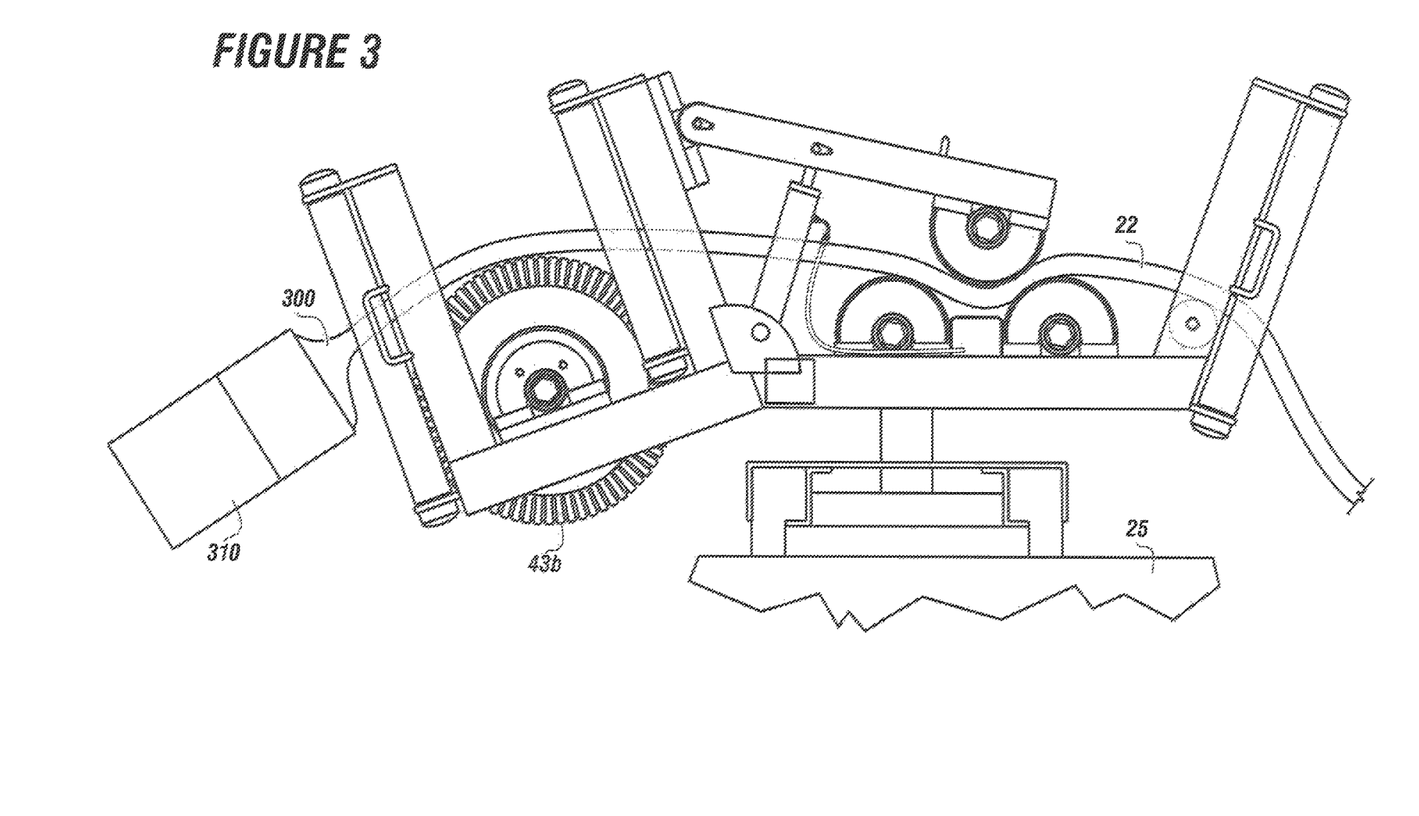
FIG. 3 depicts the retrieved fuel hose being loaded into a moveable container with a distal end of the fuel hose is resting on the lead roller.

FIG. 3 depicts the fuel hose being loaded into the support structure wherein the distal end of the fuel hose is resting on the lead roller.

The support structure 25 is shown. A distal end 300 of the fuel hose 22 can have a coupling 310. The coupling 310 can be guided by the lead rollers; lead roller 43b is shown. The lead rollers, by guiding the coupling 310, can ensure a smooth operation and eliminate the need for manual lifting or other intervention to prevent the coupling 310 from catching on the frame. The radius of the lead rollers can aid in guiding the coupling 310 to ensure that no binding occurs.

Figure 4:
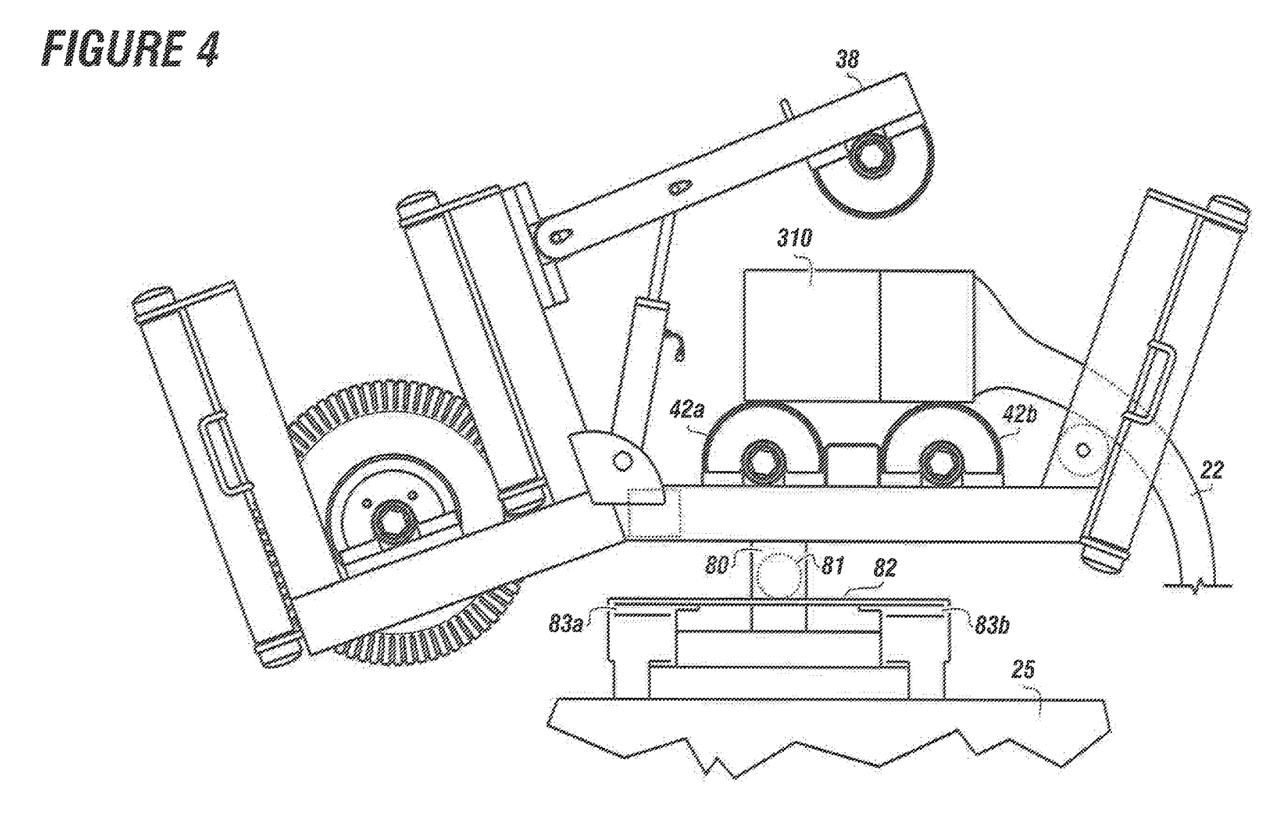
FIG. 4 depicts the fuel hose passing over lower drive rollers.

FIG. 4 depicts the apparatus feeding the fuel hose into the support structure once the coupling has moved to at least a portion of the lower drive rollers.

The drive arm 38 can be lifted to allow the coupling 310 to pass over the lower drive rollers 42a and 42b. An operator can manually place the coupling 310 of the fuel hose 22 into the support structure 25.

The apparatus can be operated to retrieve a plurality of fuel hose sections connected together by couplings. The drive arm can be lifted each time a coupling in presented to allow the coupling to pass through the apparatus. The ability to raise the drive arm allows a plurality of connected fuel hose sections to be retrieved without the need to disconnect them.

The apparatus can be connected with the support structure 25 by a rotating member 80. The rotating member 80 can be a ball joint, a swivel joint, or another connection member capable of 360 degree rotation.

One or more locking pins 81 can be configured to lock the apparatus in a desired position.

The rotating member 80 can be connected with a mounting plate 82. The mounting plate 82 can be operatively engaged with mounting rails 83a and 83b. The mounting plate 82 can be moved about the mounting rails 83a and 83b to move the apparatus horizontally relative to the support structure 25.

One or more locking mechanisms can be used to lock the mounting plate in position. For example, a first receiving hole can be located in the mounting rails adjacent a first end of the mounting rails, a second receiving hole can be located in the mounting rails adjacent a second end of the mounting rails, and a third receiving hole can be located between the first receiving hole and the second receiving hole.

A spring loaded locking pin can be operatively disposed through the mounting plate. Consequently, to move the apparatus the spring loaded locking pin can be pulled away from the mounting rails, and as the apparatus moves along the mounting rails, the spring loaded locking pin can snap into one of the receiving holes when aligned therewith.

Figures 5A, 5B:
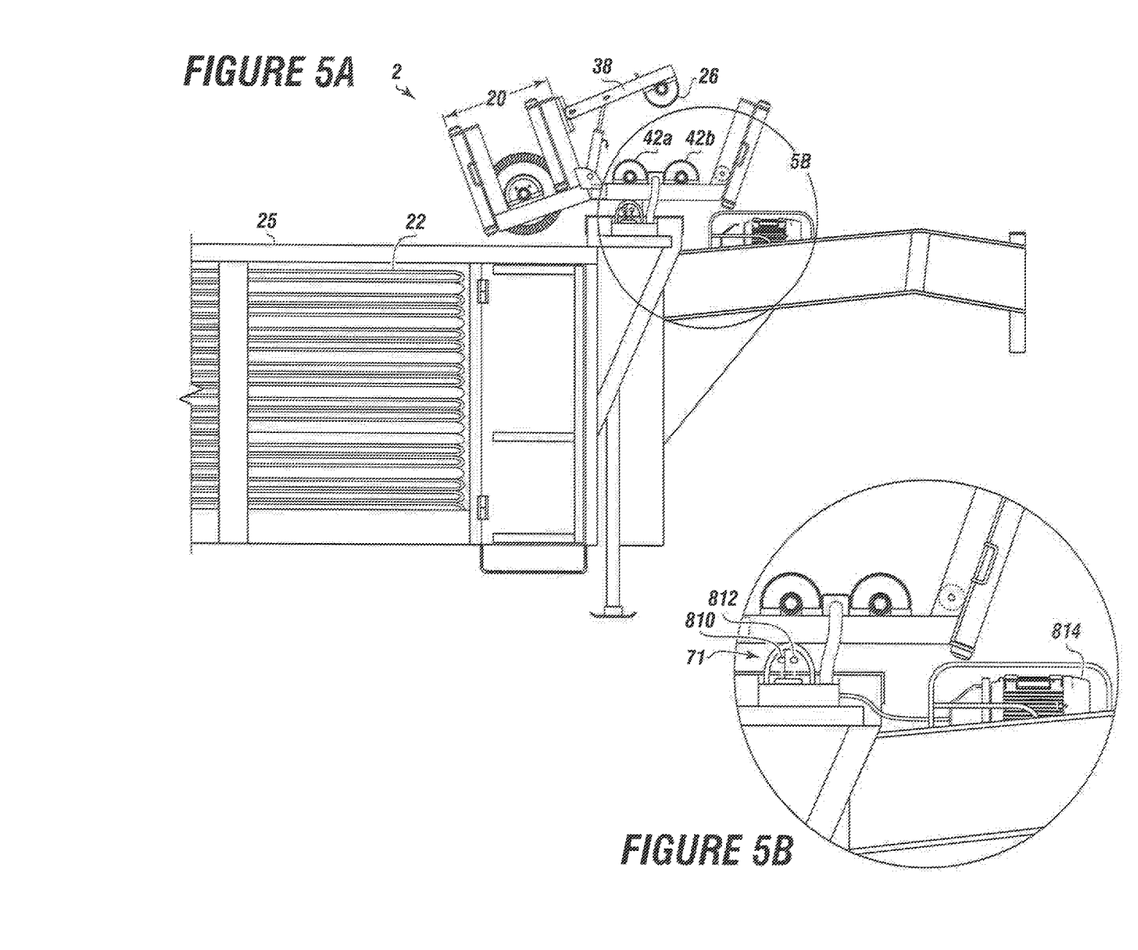
FIG. 5A depicts a support structure with the fuel hose stored therein and the tugger in a travel position.
FIG. 5B depicts a detailed view of a power system for the tugger.

FIG. 5A depicts a support structure with the fuel hose stored therein and the apparatus in a travel position.

The fuel hose 22 can be stored in the support structure 25. The apparatus 2 can be in a travel position with the drive arm 38 positioned such that the top drive roller 26 is adjacent the lower drive rollers 42a and 42b.

The first segment 20 is rotated to be proximate the support structure 25.

FIG. 5B depicts a detailed view of a power system.

The power system 71 can include a cylinder control 810 and a drive roller control 812. A power supply 814 can energize the powered cylinders and the motor. The cylinder control 810 and the drive roller control 812 can control the delivery of the operation of the powered cylinders and the motor.

The cylinder control 810 and the drive roller control 812 can be remote from the apparatus. The cylinder control 810 and the drive roller control 812 can communicate with the power system.

The power supply 814 can be a hydraulic pump, a pneumatic pump, an electric power source, an internal combustion engine, or the like.

Referring to FIG 5A and 5B, the apparatus 2 can deploy fuel hose 22 from the support structure 25. The first segment 20 is proximate the support structure 25. The fuel hose 22 can be loaded into the apparatus 2 by placing at least a portion of a proximate end of the fuel hose 22 on at least a portion of the lower drive rollers 42a and 42b.

The drive arm 38 can be moved to operatively engage the top drive roller 26 with the fuel hose 22, and the power system 71 can be operated to drive one or more of the drive rollers. The top drive roller 26 and the lower drive rollers 42a and 42b can cooperate to urge the fuel hose 22 through the apparatus 2 and to a desired deployment location. The desired location can be a work site, a container, or the like.

Figure 6:
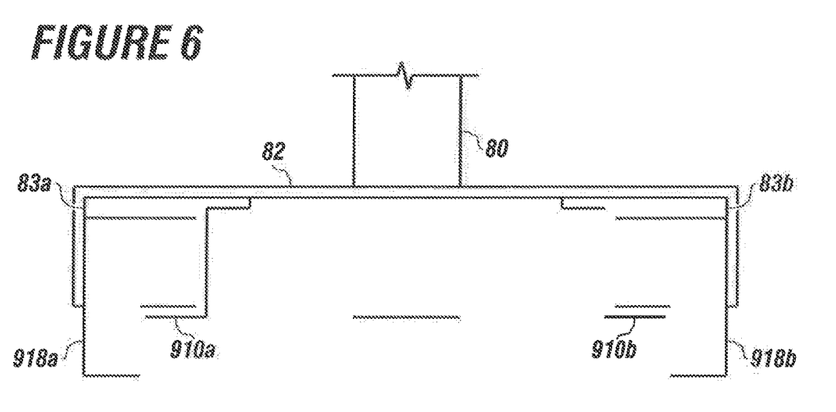
FIG. 6 depicts left detailed view of the mounting rails and the mounting plate engaged therewith for use with the method.

FIG. 6 depicts left detailed view of the mounting rails and the mounting plate engaged therewith.

The mounting rails 83a and 83b can be supported by support blocks 918a and 918b.

The mounting plate 82 can be engaged with the mounting rails 83a and 83b. Slide guides 910a and 910b can guide the mounting plate 82 about the mounting rails 83a and 83b.

The rotating member 80 can be connected with the mounting plate 82.

Figure 7A:
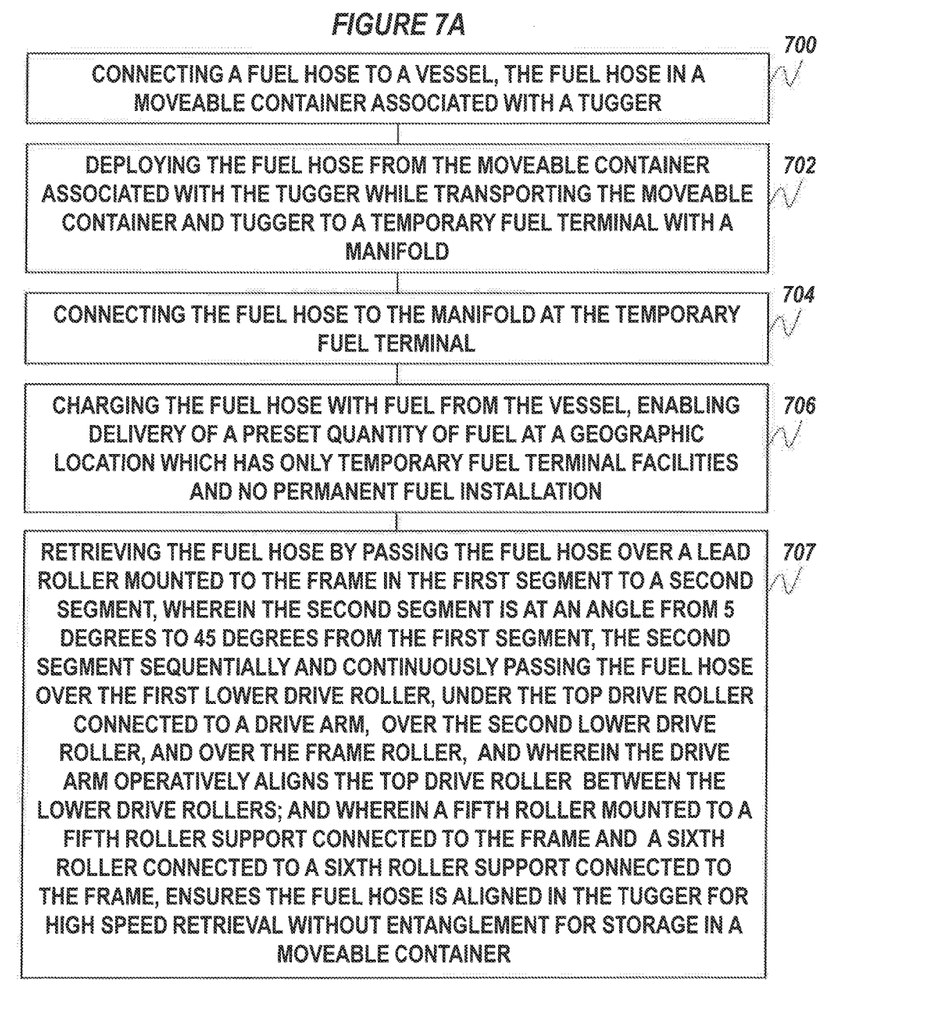
FIGS. 7A and 7B depicts a first embodiment of the method.
Figure 7B:
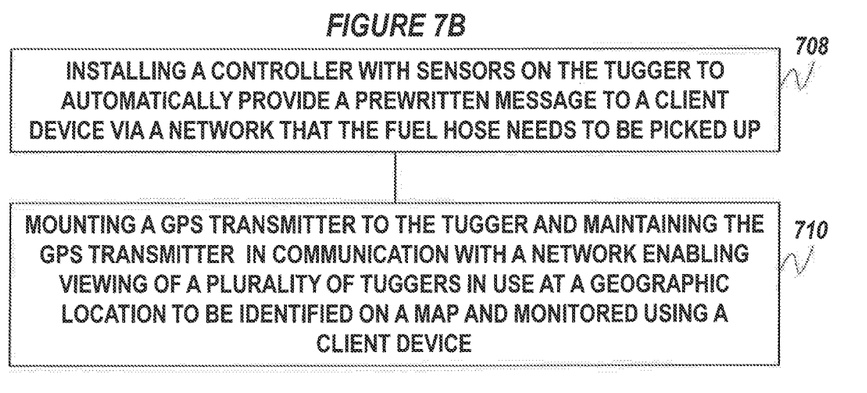

The method for transporting fuel to a geographic specific location and retrieving empty fuel hose is shown in FIG. 7.

Box 700 shows the step of connecting a fuel hose to a vessel, the fuel hose in a moveable container associated with a tugger.

Box 702 depicts the step of deploying the fuel hose from the moveable container associated with the tugger while transporting the moveable container and tugger to a temporary fuel terminal with a manifold.

Box 704 shows the step of connecting the fuel hose to the manifold at the temporary fuel terminal.

Box 706 depicts the step of charging the fuel hose with fuel from the vessel, enabling delivery of a preset quantity of fuel at a geographic location which has only temporary fuel terminal facilities and no permanent fuel installation.

Box 707 involves the step of retrieving the fuel hose by passing the fuel hose over a lead roller mounted to the frame in the first segment to a second segment, wherein the second segment is at an angle from 5 degrees to 45 degrees from the first segment, the second segment sequentially and continuously passing the fuel hose over the first lower drive roller, under the top drive roller connected to a drive arm, over the second lower drive roller, and over the frame roller, and wherein the drive arm operatively aligns the top drive roller between the lower drive rollers; and wherein a fifth roller mounted to a fifth roller support connected to the frame and a sixth roller connected to a sixth roller support connected to the frame, ensures the fuel hose is aligned in the tugger for high speed retrieval without entanglement for storage in a moveable container.

Box 708 depicts the step of installing a controller with sensors on the tugger to automatically provide a prewritten message to a client device via a network that the fuel hose needs to be picked up.

Box 710 depicts the step of mounting a GPS transmitter to the tugger and maintaining the GPS transmitter in communication with a network enabling viewing of a plurality of tuggers in use at a geographic location to be identified on a map and monitored using a client device.

Figure 8:
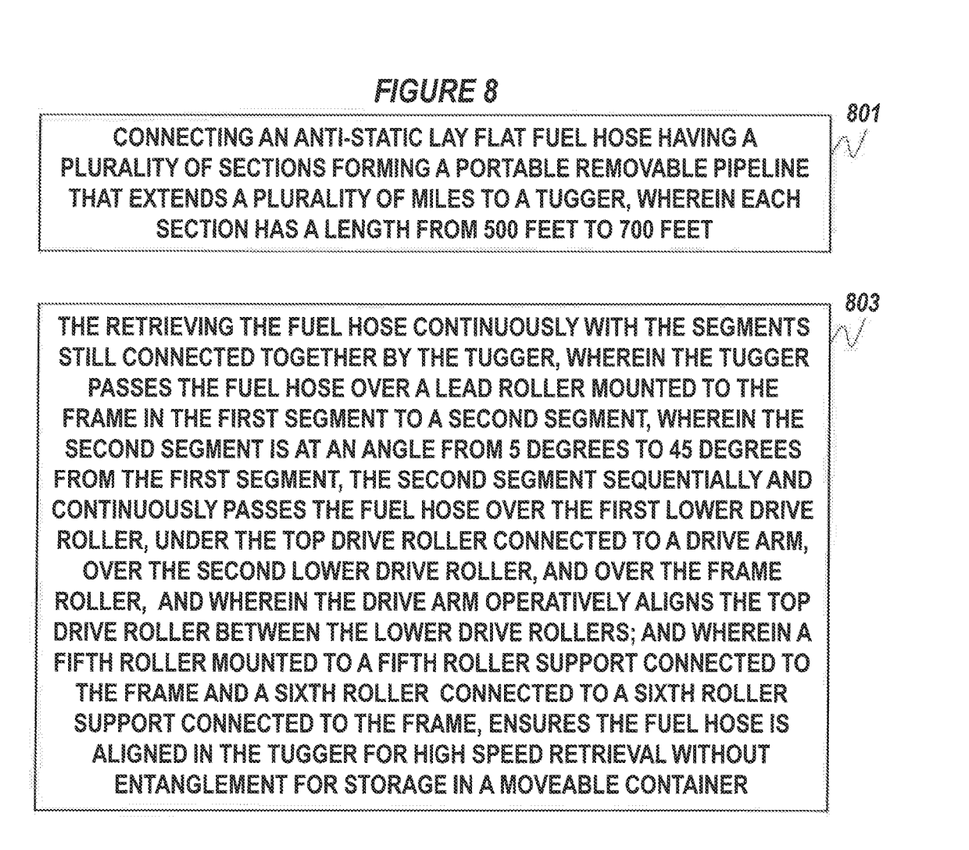
FIG. 8 depicts a different embodiment of the method.

FIG. 8 depicts another method for retrieving empty fuel hose after fuel is delivered by the fuel hose to a remote location, Box 801 depicts the step of connecting an anti-static lay flat fuel hose having a plurality of sections forming a portable removable pipeline that extends a plurality of miles to a tugger, wherein each section has a length from 500 feet to 700 feet, Box 803 depicts the step of retrieving the fuel hose continuously with the segments still connected together by the tugger, wherein the tugger passes the fuel hose over a lead roller mounted to the frame in the first segment to a second segment, wherein the second segment is at an angle from 5 degrees to 45 degrees from the first segment, the second segment sequentially and continuously passes the fuel hose over the first lower drive roller, under the top drive roller connected to a drive arm, over the second lower drive roller, and over the frame roller, and wherein the drive arm operatively aligns the top drive roller between the lower drive rollers; and wherein a fifth roller mounted to a fifth roller support connected to the frame and a sixth roller connected to a sixth roller support connected to the frame ensures the fuel hose is aligned in the tugger for high speed retrieval without entanglement for storage in a moveable container.

The following three examples more fully describe the methods of the invention.

EXAMPLE 1

Method to Create Temporary Quickly Removable Fuel Depot

In the case a major hurricane or other major disaster, quickly deployed fuel hoses are needed to help victims and first responders create temporary fuel infrastructure.

The method involves a sequence of steps with unique equipment, namely a tugger, to quickly create a temporary fuel infra-structure to stop death of victims and save lives of people in the disaster area.

This method can be used to quickly supply fuel for a hospital district with patients recovering from life threatening illnesses.

First, a fuel hose, such as, a 6 inch ID fuel hose made from polyurethane is connected to a vessel, such as a fuel barge.

The fuel hose is 3 miles long and made from 24 connected segments.

The fuel hose is stored flat in a moveable container such as an ISO container ship container.

A tugger is mounted on the top and from side of the ISO container.

Next, the fuel hose is deployed from the moveable container after the moveable container is mounted on a flatbed truck, and the truck is driven along a predetermined route at a rate of 9 mph.

The fuel hose continuously unfolds from the ISO container to lay flat on the ground as the truck moves with no need to stop and install fuel hose connections.

The ISO container with attached tugger is transported to a bladder farm with a manifold.

The bladder farm for this example has 6 inflatable fuel bladders and a central manifold made from aluminum pipe provides fuel from the manifold via jumper lines to each of the fuel bladders.

The fuel hose is connected to the manifold using just one VICTAULIC™ clamp to ensure a secure leak free connection.

Next the fuel hose is charged with fuel from the vessel.

The fuel is JP8 diesel fuel enabling delivery of a preset quantity of fuel, in this case 60,000 gallons to be delivered to a geographic location such as a disaster area, where a hurricane or tornado ravaged the site and now cars, ambulances, first responder vehicles such as firetrucks and coast guard boats need a supply of fuel to a location incapable of sustaining metal piping and which only has temporary fuel terminal facilities without a permanent installation.

One the 60,000 gallons has been deployed to the fuel bladders, the fuel hose must be retrieved quickly and efficiently, as rising flood waters, and debris from the storm may cut the fuel hose.

The fuel hose is retrieved by the tugger.

The tugger first passes the libel hose over a lead roller 43 mounted to the frame 10 in the first segment 20 and transfers the fuel hose to a second segment 21. The lead roller 43 is formed from a pair of 25 OD tires that are mounted to a single shaft so they both spin in tandem. The tires have treads enabling case of fuel hose pick up by providing rubber to polyurethane gripping which is also antistatic.

The tugger picks up the fuel hose while the ISO container is moved down the line at a rate of 5 miles per hour (mph).

The second segment is horizontal to the ground and the first segment is pitched at an. angle of 20 degrees from the first segment.

The second segment sequentially and continuously passes the fuel hose over the first lower drive roller 42a, under the top drive roller 26 connected to a drive arm 38, over the second lower drive roller 42b, and over the frame roller 62.

The first lower drive roller 42a can be a 6 and ⅝ inch. OD rollers mounted on a single shaft.

The top drive roller 26 can be a single of 6 and ⅝$^{th}$ OD roller. Each top drive roller is mounted on a separate shaft with a pillow block bearing on each side.

The second lower drive roller 42b can be a 6 and ⅝ inch OD rollers which is the same size from the first lower drive roller. The first and second lower drive rollers are mounted on two different shafts 44a and 44b.

The drive arm 38 operatively aligns the top drive roller 26 between the lower drive rollers 42ab using a hydraulic cylinder capable of pulling down the drive arm and squeezing the fuel hose so it won't slip out, wherein the pressure needing to be entered is at least 1000 pounds, The arm is controlled by a hydraulic control mounted to a moveable control bank, which can be operable by a robot, by a processor and a human. The hydraulic reservoir is connected to the hydraulic power pack or onboard hydraulics of the vehicle that the ISO container is mounted to. The hydraulic power pack provides the pressure and flow to run the tugger.

A fifth roller 61a mounted to a fifth roller support 60a and sixth roller 61b connected to a sixth roller support 60b are both connected to the frame to ensure the fuel hose is aligned in the tugger for high speed retrieval without entanglement for storage in a moveable container.

The fifth roller and the sixth roller can be 2 and ½ inch OD carbon steel that each roll on separate shafts that are parallel to each other. The roller supports are made from carbon steel that is capable of resisting deformation at pressures or load over 1000 pounds per square inch.

EXAMPLE 2

Fuel Emergency Bypass Method

In cases where fuel pipelines are damaged to the point they can no longer pump fuel, a lay flat fuel hose can be quickly deployed during the time the fuel pipeline is being repaired, thereby creating a temporary fuel bypass.

To achieve the fuel emergency bypass, a fuel hose made of nitrile rubber is connected to a vessel such as the good section of the preexisting fuel pipeline.

The fuel hose in a moveable container, such as an open trailer connected to a pickup truck. The open trailer supports a tugger usable to retrieve the fuel hose.

Second the fuel hose is deployed from the moveable container, which also supports the tugger. The tugger is mounted on the front of the open trailer.

While driving the pickup towing the moveable container at 12 mph, the fuel hose unfolded and deployed from the open trailer onto the ground to reach the other undamaged portion of the existing fuel pipeline.

Now the fuel hose is connected to a manifold connected to the other side of the fuel pipeline.

The fuel hose is charged with fuel from the good undamaged side of the pipeline.

The fuel is a diesel fuel derivative such as kerosene.

The fuel hose transfers a preset quantity of fuel around the broken fuel pipeline without installing permanent pipe, and only using temporary fuel hoses without a permanent installation or digging in the ground.

Next the fuel hose is retrieved by passing the fuel hose over a lead roller 43 mounted to the frame that mounts to the open trailer. The frame has a first segment of the tugger.

The first segment of the tugger is pitched at an angle from 20 degrees from a second segment mounted to the frame which is generally horizontal to the ground.

The second segment sequentially and continuously passes the fuel hose over the first lower drive roller 42a, under the top drive roller 26 connected to a drive arm 38, over the second lower drive roller 42b, and over the frame roller 62.

The fuel hose can be picked up at the same rate that the pickup drives to pick up the fuel hose that is 2 miles per hour.

The drive arm 38 operatively aligns the top drive roller 26 between the lower drive rollers 42*ab* and a fifth roller 61*a* mounted to a fifth roller support 60*a* connected to the frame and sixth roller 61*b* connected to a sixth roller support 60*b* connected to the frame, ensure the fuel hose is aligned in the tugger for high speed retrieval without entanglement for storage in a moveable container.

EXAMPLE 3

Method For Clean Up of Spilled Toxic Liquids

First, a fuel hose is connected to a floating skimmer.

The fuel hose in a moveable container, such as a closed storage container that has an opening for rapid deployment of fuel hose.

The fuel hose is deployed from the moveable container while transporting the moveable container with associated tugger to a floating storage container or tanker trucks waiting on shore from an oil spill or other toxic liquid spill.

Next, the fuel hose is connected to the floating storage tank.

The fuel hose is charged with toxic liquids form the spill using a pump.

A preset quantity of toxic liquid can be removed with equipment that provides a temporary toxic liquid removal facility without a permanent installation Once the preset quantity of liquid is cleaned up, the fuel hose is retrieved by passing the fuel hose over a lead roller 43 mounted to the frame 10 in the first segment 20 to a second segment 21, wherein the second segment is at an angle 15 degrees from the first segment.

The second segment sequentially and continuously passes the fuel hose over the first lower drive roller 42*a*, under the top drive roller 26 connected to a drive arm 38, over the second lower drive roller 42*b*, and over the frame roller 62, and wherein the drive arm 38 operatively aligns the top drive roller 26 between the lower drive rollers 42*ab*, and wherein a fifth roller 61*a* mounted to a fifth roller support 60*a* connected to the frame and sixth roller 61*b* connected to a sixth roller support 60*b* connected to the frame ensure the fuel hose is aligned in the tugger for high speed retrieval at 6 mph without entanglement for storage in a moveable container,

EXAMPLE 4

Remote Fuel Deployment By A Moveable Robot

The invention relates to a method for retrieving empty fuel hose after fuel is delivered by fuel hose to a remote location, The fuel can be at a sea coast terminal location. On the opposite ends, the fuel hose is positioned at a remote location that can be 101 miles away in the center of a desert with no infrastructure, no electricity, and minimal unskilled labor.

This method involves connecting an anti-static lay flat fuel hose such as a TIPSA OROFLEX™ 30 oil fuel hose having a plurality of fuel hose sections with connected reusable fuel hose couplings to the sea coast terminal.

The fuel hose has 3 to 4 antistatic wires that run through the hose to provide antistatic couplings on each end of the fuel hose, reducing conductivity from one end of the fuel hose to the other end of the fuel hose. Both ends of the fuel hose have ground rods attached to the fuel hose and to pumps that flow fluid through the fuel hose to ensure a proper electrical ground.

A moving robot with GPS positioning can deploy the fuel hose onto the ground.

The fuel hose forms a portable removable pipeline that extends 50 miles from the floating vessel. Each fuel hose section has a length from 500 feet to 700 feet.

A tugger mounted to the same moving robot with movable storage container is mounted so as to retrieve the flat fuel hose into the moveable storage container continuously, uninterrupted, and without disconnecting segments of fuel hose. The tugger continuously pulls miles of fuel hose into the moveable container without breaking the fuel hose, and without spilling liquid on the ground.

The tugger retrieves the flat fuel hose continuously without disconnecting the reusable couplings used to connect segments of fuel hose. The still connected segments are pulled into the movable storage container quickly and without tearing the fuel hose, and laying the fuel hose for fast deployment. The tugger provides for self-alignment of fuel hose by the tugger into the moveable storage container, forming a small footprint of fuel hose that is not knotted or snarled.

The tugger passes the fuel hose over a lead roller 43 mounted to the frame 10 in the first segment 20 to a second segment 21, wherein the second segment is at an angle of 45 degrees from the first segment.

The second segment sequentially and continuously passes the fuel hose over the first lower drive roller 42*a*, under the top drive roller 26 connected to a drive arm 38 which can apply 2000 psi onto the fuel hose, then over the second lower drive roller 42*b*, and over the frame roller 62.

The drive arm 38 operatively aligns the top drive roller 26 between the lower drive rollers 42*a* and a fifth roller 61*a* mounted to a fifth roller support 60*a* connected to the frame and sixth roller 61*b* connected to a sixth roller support 60*b* connected to the frame ensure the fuel hose is aligned in the tugger for high speed retrieval such as 4 mph while the without entanglement of the fuel hose for storage in a moveable container.

While these embodiments have been described with emphasis on the embodiments, it should be understood that within the scope of the appended claims, the embodiments might be practiced other than as specifically described herein.

What is claimed is:

1. A method for transporting fuel to a geographic specific location and retrieving an empty fuel hose comprising:
   a. connecting a fuel hose to a vessel, the fuel hose in a moveable container associated with a tugger, the tugger comprises:
      (i) a frame having a first segment connected with a second segment, wherein the first segment is at an angle of from five degrees to forty-five degrees with the second segment;
      (ii) at least one lower drive roller secured to the second segment;
      (iii) a drive arm secured to the frame;
      (iv) a top drive roller secured with the drive arm, wherein the top drive roller can be operatively aligned with the lower drive roller by moving the drive arm;
      (v) at least one roller support connected with the frame;
      (vi) at least one roller operatively supported by the at least one roller support;

(vii) at least one lead roller secured with the first segment; and
(viii) a frame roller secured with the second segment opposite the first segment;
b. deploying the fuel hose from the moveable container associated with the tugger while transporting the moveable container and the tugger to a temporary fuel terminal with a manifold;
c. connecting the fuel hose to the manifold;
d. charging the fuel hose with fuel from the vessel, wherein the fuel is a diesel fuel or a diesel fuel derivative enabling delivery of a preset quantity of the fuel at a geographic location, which has only the temporary fuel terminal without a permanent installation;
e. retrieving the fuel hose by passing the fuel hose over a the lead roller mounted to the frame in the first segment to a the second segment; wherein the second segment is at an angle from five degrees to forty-five degrees from the first segment; wherein the second segment sequentially and continuously passes the fuel hose over the first at least one lower drive roller, under the top drive roller connected to a the drive arm, over the a second lower drive roller, and over the frame roller; wherein the drive arm operatively aligns the top drive roller between the lower drive rollers; and wherein a fifth roller mounted to a fifth roller support connected to the frame and sixth roller connected to a sixth roller support connected to the frame, ensuring the fuel hose is aligned in the tugger for high speed retrieval without entanglement for storage in the moveable container.

2. The method of claim 1, wherein the high speed retrieval is from one mile per hour to five mile per hour.

3. The method of claim 1, wherein the high speed retrieval is at a variable speed.

4. The method of claim 1, comprising positioning the tugger between a fuel terminal and the temporary fuel terminal.

5. The method of claim 1, wherein the temporary fuel terminal is a bladder farm comprising a plurality of inflatable rubber tanks connected to a central manifold for deployment of fuel to a plurality of equipment needing fuel.

6. The method of claim 1, wherein the vessel is at least one of: a truck, a tanker, a barge, and an aircraft fuel tanker.

7. The method of claim 1, comprising moving the drive arm using at least one powered cylinder.

8. The method of claim 1, comprising using a first powered cylinder attached between the drive arm and the frame, and a second powered cylinder attached between the drive arm and the frame opposite the first powered cylinder, for raising or lowering the drive arm.

9. The method of claim 1, comprising connecting a motor to the top drive roller, the at least one lower drive roller, or both.

10. The method of claim 1, comprising installing a controller with at least one sensor on the tugger to automatically provide a prewritten message to a client device via a network that the fuel hose needs to be picked up.

11. The method of claim 10, comprising mounting a GPS transmitter to the tugger, the GPS transmitter in communication with the network enabling viewing of a plurality of tuggers in use at a geographic location identified on a map and monitoring the tuggers using the client device.

* * * * *